United States Patent Office 3,335,059
Patented Aug. 8, 1967

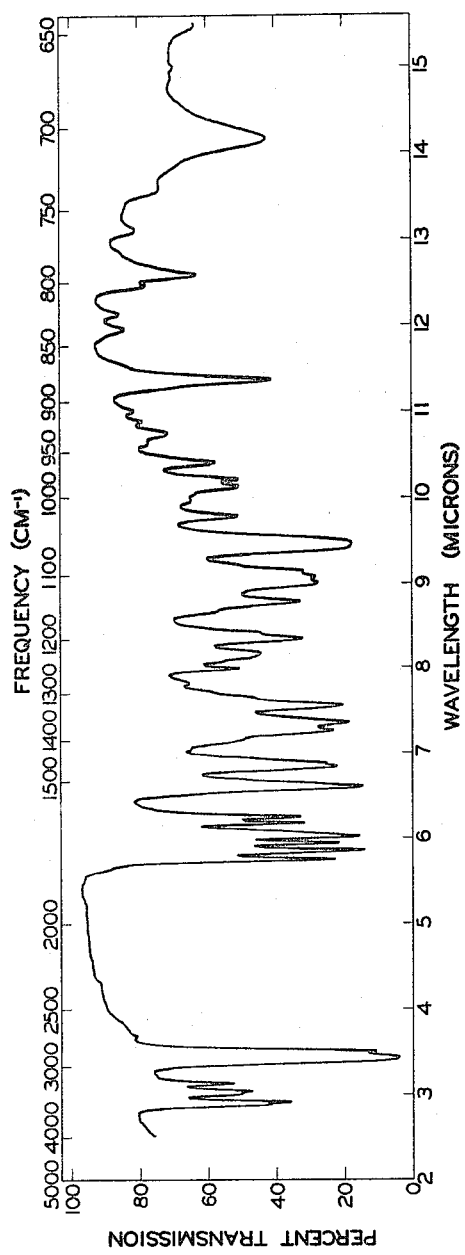

3,335,059
ANTIBIOTIC A-10598 AND METHOD
OF PRODUCING
Donald C. De Long, Marvin M. Hoehn, and James M. McGuire, Indianapolis, Ind., assignors to Eli Lilly and Company, Indianapolis, Ind., a corporation of Indiana
Filed Oct. 7, 1966, Ser. No. 598,552
3 Claims. (Cl. 167—65)

This application is a continuation-in-part of our application Ser. No. 329,123, filed Dec. 9, 1963, now abandoned.

The present invention relates to a novel antibiotic agent and to its preparation. More particularly, the invention relates to a novel antibiotic which possess in vitro antiviral properties and is distinguished by its lack of antibacterial and antifungal properties usually associated with such agents. It is denominated herein by the arbitrary number A-10598.

Antibiotic A-10598 is a yellow crystalline solid melting at about 258° C. It is soluble in most of the common organic solvents such as the lower alcohols, lower alkyl esters of lower alkanoic acids, ketones, chloroform, dimethylformamide, and dimethyl sulfoxide, but insoluble in hydrocarbons such as benzene and petroleum ether. It is only slightly soluble in water (8 mcg./ml. in aqueous pH 7.6 buffer).

Electrometric titration of A-10598 in 2:1 dimethylformamide-water solution gives a pK'a value of 11.45. The compound is yellow in acid and turns purple in base. The ultra-violet absorption spectrum of a solution of A-10598 in ethanol has a first maximum at 257 m$\mu$ with an absorptivity value of $$E_{1cm.}^{1\%} = 276$$

and a second maximum at 306 m$\mu$ with an absorptivity value of $$E_{1cm.}^{1\%} = 334$$

An average of several elemental microanalyses has shown A-10598 to have approximately the following composition: C, 61.85%; H, 7.28%; N, 5.00%; O, 24.20%. The samples employed for the analyses were dried in vacuo for one-half hour at 100° C. over phosphorus pentoxide. Group analysis of the molecule of A-10598 has shown that there are six methoxyl groups present, a minimum of three C-methyl groups, and no N-methyl moiety. The presence of the carbonyl grouping was shown by the formation of a 2,4-dinitrophenylhydrazone derivative having a melting point of about 255° C.

The ultraviolet and visible absorption spectrum of the 2,4-dinitrophenylhydrazone derivative as determined in ethanol solution under neutral conditions had a first maximum at 254 m$\mu$ with an absorptivity value of $$E_{1cm.}^{1\%} = 330$$

a second maximum at 466 m$\mu$ with an absorptivity value of $$E_{1cm.}^{1\%} = 360$$

and a third maximum at 615 m$\mu$ with an absorptivity value of $$E_{1cm.}^{1\%} = 315$$

In addition, shoulders appeared in the curve at 320 m$\mu$ and at 410 m$\mu$.

The determination of the ultraviolet and visible absorption spectrum of the 2,4-dinitrophenylhydrazone derivative in ethanol solution under acidic conditions yielded a curve having a first maximum at 254 m$\mu$ with an absorptivity value of $$E_{1cm.}^{1\%} = 330$$

a second maximum at 466 m$\mu$ with an absorptivity value of $$E_{1cm.}^{1\%} = 545$$

and shoulders at 320 m$\mu$ and 410 m$\mu$.

When the ultraviolet and visible absorption spectrum of the 2,4-dinitrophenylhydrazone derivative was determined in the same solvent under alkaline conditions, the first maximum occurred at 254 m$\mu$ with an absorptivity value of $$E_{1cm.}^{1\%} = 330$$

and the second maximum at 616 m$\mu$ with an absorptivity value of $$E_{1cm.}^{1\%} = 715$$

The remainder of the spectrum was featureless.

Titration with base has indicated that the molecule of A-10598 contains a phenolic hydroxyl group, and acid hydrolysis has demonstrated the presence of a labile primary —NH$_2$ group.

A sample of A-10598 recrystallized from an acetone-water mixture and examined using X-ray powder diffraction techniques was found to possess the follow characteristics, unique with this compound:

X-ray powder diffraction data

| Interplanar spacing, d (A.): | Relative intensities I/I$_1$ |
|---|---|
| 14.0 | 1.00 |
| 10.6 | 1.00 |
| 9.36 | 0.13 |
| 7.35 | .40 |
| 6.90 | .40 |
| 6.58 | .53 |
| 5.97 | .27 |
| 5.62 | .40 |
| 5.22 | .40 |
| 5.08 | .13 |
| 4.58 | .13 |
| 4.42 | .13 |
| 3.97 | .40 |
| 3.86 | .13 |
| 3.80 | .13 |
| 3.60 | .40 |

The infrared absorption curve of A-10598, determined as a mull in mineral oil, is shown in the accompanying drawing. The distinguishable bands in the infrared absorption spectra over the range of 2.0–15.0 microns are as follows: 2.88 (shoulder), 2.91, 3.02 (shoulder), 3.04, 3.13, 5.77, 5.87, 5.96, 6.03, 6.20, 6.27, 6.62, 6.86, 6.98 (shoulder), 7.26, 7.36, 7.56, 7.64 (shoulder), 7.99, 8.17, 8.35, 8.42 (shoulder), 8.79, 9.00, 9.08 (shoulder), 9.14 (shoulder), 9.45, 9.78, 10.13, 10.21, 10,41, 10.62 (shoulder), 10.74, 10.88 (weak), 11.00 (weak), 11.36, 11.95 (weak), 12.13 (weak), 12.46 (shoulder), 12.58, 13.10 (weak), 13.58 (weak), 14.16.

In chloroform solution, at a temperature of 25° C., the specific rotation of sodium D light by A-10598 is +67.6° when the concentration of the antibiotic is 0.5 percent on a weight-per-volume basis. The sample employed for the determination of the optical rotation was crystallized from aqueous acetone and was dried at room temperature in a vacuum desiccator over phosphorus pentoxide.

The molecular weight calculated from the electrometric titration data is 625. The imperical formula as calculated from all the accumulated data is $C_{32}H_{48}N_2O_{10}$.

It has been found that A-10598 can be hydrogenated using as catalyst palladinized charcoal, from which hydrogenation there is obtained a colorless product. The ultraviolet absorption spectrum of the reduced compound, when determined under neutral conditions in ethanol, is characterized by a shoulder at 250 mμ and a maximum at 298 mμ, as well as intense end absorption. When the reduced A-10598 is acetylated using acetic anhydride in pyridine, the ultraviolet absorption spectrum of the product shows intense end absorption with shoulders at 280 mμ and 304 mμ. On addition of potassium hydroxide to the acetylated material, the band at 298 mμ observed in the spectrum of the reduced A-10598 reappears.

Antibiotic A-10598 shows *in vitro* activity against Odeno III virus, Polio III virus, and vaccinia virus. It is inactive against *E. coli* phage, protozoa, algae, bacteria, and fungi.

The in vitro antiviral activity of A-10598 against the growth of Adeno III virus and Polio III virus is readily demonstrated by using the agar overlay system of Siminoff, Applied Microbiology, 9 (1) 66-72 (1961), somewhat modified. The method is as follows: Primary rhesus monkey kidney cells are grown in 31-ounce medicine bottles. The cells are removed from the medicine bottles with a solution of 0.25 percent trypsin (Difco) in tris-buffered saline. The action of the trypsin is stopped at the desired point by washing the cells in the complete media, after which washing the cell pack is measured. A 1:1,000 dilution of the cells is made in a medium composed of Difco 199 medium together with 5 percent horse serum, 10 percent tryptose phosphate, penicillin, 150 units/ml., and streptomycin, 150 mcg./ml. The cell suspension is then added to dishes according to the following schedule:

|     |                          | ml. |
|-----|--------------------------|-----|
| (a) | 100-mm. petri dishes     | 15  |
| (b) | 150-mm. petri dishes     | 50  |
| (c) | 9" x 14" Pyrex baking dishes | 200 |

The petri dishes are placed in an incubator flushed with 5 percent $CO_2$ while the baking dishes are sealed with Saran wrap. All are incubated at 37° C. until a confluent sheet of cells appears upon microscopic examination, which requires from 48 to 96 hours.

The sealed baking dishes are used for Polio III virus, and the petri dishes for Adeno III virus. Medium is withdrawn from all dishes, and a 1:100 dilution of the respective virus in tris-buffered saline is added to the dishes according to the following schedule:

|     |                          | ml. |
|-----|--------------------------|-----|
| (a) | 100-mm. petri dishes     | 5   |
| (b) | 150-mm. petri dishes     | 25  |
| (c) | 9" x 14" Pyrex baking dishes | 100 |

The Polio III virus absorption period is 45 minutes and the Adeno III virus absorption period is 3 hours.

The overlay is prepared as follows: A 2-percent solution of 2X difco purified agar is made up in triple-distilled water. To 100 ml. of lactalbumin hydrolysate (LAH) tryptose phosphate medium (2X) are added 14 ml. horse serum, 0.6 ml. of aqueous solution containing penicillin and streptomycin at respective concentrations of 150 units and 150 mcg. per milliliter, and 1 ml. of 4.5 percent sodium bicarbonate solution. Equal amounts of the 2X agar and the 2X LAH medium are mixed and held at 41° C. Virus suspension is withdrawn from the dishes and the agar mixture overlay added to the dishes in the following amounts:

|     |                          | ml. |
|-----|--------------------------|-----|
| (a) | 100-mm. petri dishes     | 8   |
| (b) | 150-mm. petri dishes     | 30  |
| (c) | 9" x 14" Pyrex baking dishes | 150 |

The dishes are placed at a level attitude and allowed to solidify. Using a grid under the plates 7-mm. pads, which have been dipped in a solution of the substancce udergoing test and dried in a vacuum oven, are applied to the surface of the agar. Each pad takes up 0.02 ml. of the solution. The dishes are placed in an incubator which is flushed with 5 percent $CO_2$ and held at a temperature of 37° C. Petri dishes containing Polio III virus are thus incubated for 48-96 hours, while the dishes containing Adeno III virus are incubated for 72-120 hours. During this time, viral damage of the monkey kidney cells is detected with an inverted microscope.

When it has been determined that the viral damage to the monkey kidney cells outside the zones protected by the antibiotic is complete, the dishes are overlayed with aqueous 10 percent formalin-2 percent sodium acetate solution for a minimum of 8 hours. The upper layer of agar is floated from the dishes with running tap water and the lower layer is then stained with Wright's stain to define the zones of inhibition caused by the drugs, and the sizes of the zones are determined. When the dark-stained area is the size of a pad, that is, 7 mm. in diameter, the reading is denoted as ± to +; when the dark-stained area has a diameter of 12 mm., the value is denoted as ++; when the diameter is greater than 12 mm., the value is denoted as +++ to ++++; stained areas will show little, if any, virus cytopathogenic effect (CPE) microscopically.

TABLE I.—IN VITRO ANTIVIRAL ACTIVITY, AGAR OVERLAY SYSTEM

| Conc., mg./ml. | Amount on each pad, mcg. | Virus | |
|---|---|---|---|
| | | Adeno III | Polio III |
| 1.0 | 20 | +++ | +++ |
| 0.1 | 2 | +++ | ++ |
| 0.01 | 0.2 | ++ | + |
| 0.001 | 0.02 | ++ | + |

Using the same technique, the novel antibiotic was shown to inhibit vaccinia virus.

Further studies, using polio virus in tissue culture, have shown that A-10598 is not viricidal, does not interfere with adsorption or penetration of viruses, does not interfere with release of virus, but does have a definite action of blocking synthesis of viral components or the assembly of these components.

The novel antibiotic of this invention is useful as a research tool because of its action of blocking synthesis of viral components or the assembly of these components. The antibiotic thus is an aid in studying the growth of viruses and in developing new methods and processes of controlling viral growth.

The demonstrated ability to control viral growth makes the antibiotic particularly useful for controlling the growth of unwanted virus in tissue culture suitably when used in the concentrations and in the methods described hereinabove.

Because of the uncertainty of taxonomic studies with the Streptomyces group of organisms, there is always an element of doubt associated with the classification of a newly discovered organism. The organism which produces A-10598 is similar in some respects to the previously described species *Streptomyces hydroscopicus*, Waksman No. 3591 strain. The following basic properties which have been found in all previously identified strains of *Streptomyces hydroscopicus* are also characteristic of the strain producing A-10598:

(1) Sporophores are produced in tight spirals;
(2) Spore color is brownish-gray on certain media;
(3) A distinctive hydroscopic character is observed in some media.

In addition, the pentagonal to trapezoidal spore form which is observed in certain other strains is also present in the A-10598-producing strain.

The organism of the present invention is similar to the Waksman strain in sporophore morphology, spore morphology, hygroscopic aerial mycelium, spore color, non-production of $H_2S$, and absence of gelatin liquefaction. The strains differ in utilization of xylose, sucrose, lactose, inositol, inulin, salicin, sorbitol, and manose. The new organism is believed to be more closely related to *S. hygroscopicus*, Waksman No. 3591, than to any other before-described organism. However, the number of dissimilarities between the new organism and the Waksman strain, which does not produce A–10598, requires the classification of the newly discovered organism as a new strain of *S. hygroscopicus*. The strain of the organism which has been employed for the production of A–10598 has been placed on permanent deposit with The American Type Culture Collection at Washington, D.C., and is available to the public under accession number ATCC 15166.

*Streptomyces hygroscopicus*, ATCC 15166, was isolated from a soil sample by the following procedure: A portion of the sample was suspended in sterile distilled water and the suspension was streaked on nutrient agar. The seeded nutrient agar plates were incubated at 25–35° C. until visible colonies were observed. At the end of the incubation period, colonies of the A–10598-producing organism were transferred with a sterile platinum loop to agar slants. The agar slants were then incubated to provide suitable quantities of inoculum for the production of A–10598.

The methods employed in the taxonomic studies of the A–10598-producing strain of *S. hygroscopicus*, ATCC 15166, are those commonly used in the taxonomy of actinomycetes. Carbon utilization tests were carried out according to the method described by Pridham and Gottlieb, J. Bact., 56, 107 (1948). Results are given in the paragraphs which follow: The numbers in parentheses refer to color blocks in Maerz and Paul, Dictionary of Color (1950). Cultures were grown at 30° C. The morphology of cultures was observed on tomato paste-oatmeal agar and Czapek's agar. Morphological, physiological, and cultural characteristics were determined after 14 days' incubation. Carbon utilization was observed after 10 days' incubation.

MICROSCOPIC MORPHOLOGY

*Sport chain morphology.*—Sporophores branching monopodially forming short, compact spirals; spores are 1.4μ in 2.1μ in diameter and are trapezoidal to pentagonal in appearance.

CULTURAL CHARACTERISTICS

*Tomato paste-oatmeal agar.*—Growth abundant; aerial mycelium abundant, hygroscopic, black with some white areas; reverse brown (15–E8), no soluble pigment.

*Yeast extract agar.*—Growth abundant; aerial mycelium abundant, grey (39–A3), margin white, surface becoming hygroscopic and black after 20 days' incubation; reverse brownish yellow (15–L11); no soluble pigment.

*Emerson's agar.*—Growth moderate; aerial mycelium moderate, near white (10–A1); reverse yellow-brown (11–H8); no soluble pigment.

*Nutrient agar.*—Growth fair; no aerial mycelium; reverse light yellow (11–H8); no soluble pigment.

*Bennet's agar.*—Growth moderate; aerial mycelium moderate, grey (47–A3) becoming black and hygroscopic in older cultures, scattered areas of white; reverse yellow-brown (14–H9); no soluble pigment.

*Inorganic salts-starch.*—Abundant growth; aerial mycelium abundant, grey (22–A1) interpersed with light grey (20–A1) areas, becoming hygroscopic and black in older cultures; reverse greyish yellow (11–G3); no soluble pigment.

*Glucose-asparagine.*—Growth moderate; aerial mycelium moderate, white with black, hygroscopic marginal areas; reverse greyish yellow (11–E2); no soluble pigment.

*Czapek's agar.*—Growth moderate; aerial mycelium moderate, grey (22–A1) with white areas, becoming brownish grey (16–A8); reverse pale yellow (10–C2); no soluble pigment.

*Tyrosine agar.*—Growth poor; no aerial mycelium in 14 days, brownish grey (15–A5) after 20 days; reverse light yellow-brown (11–E5); no soluble pigment.

*Calcium malate.*—Growth fair; aerial mycelium fair, white; reverse light yellow (10–F3); medium surrounding colonies pigmented brown.

PHYSIOLOGY

*Nitrate reduction.*—+ (slight reduction).
*$H_2S$ production.*—Negative.
*Gelatin liquefaction.*—None.
*Temperature requirements.*—Optimum growth range 30° C. to 37° C., sporulation optimum 37° C., slight growth at 43° C., very scant growth at 50° C.

In the following table are set forth the results of carbon utilization tests carried out on ATCC 15166. In the table, the symbols employed to indicate growth response have the following meanings:

+ =utilization.
(+)=probable utilization.
(−)=questionable utilization.
− =no utilization.

*Carbon utilization pattern for ATCC 15166*

| Carbon source: | Growth response |
|---|---|
| Xylose | − |
| Arabinose | + |
| Rhamnose | + |
| Dextrose | + |
| Fructose | + |
| Sucrose | (+) |
| Lactose | − |
| Raffinose | + |
| Inositol | + |
| Inulin | (+) |
| Maltose | + |
| Mannitol | + |
| Salicin | − |
| Sorbitol | (+) |
| Ribose | + |
| Trehalose | + |
| Mannose | − |

Crystalline A–10598 has an acute toxicity ($LD_{50}$) in mice, determined by intraperitoneal injection, of approximately 15.32±1.07 mg./kg.

The novel antibiotic of this invention is produced by culturing an A–10598-producing strain of *S. hygroscopicus* under aerobic conditions in a suitable culture medium until the culture medium contains substantial antibiotic activity. Most of the antibiotic activity produced during the fermentation is found in association with the liquid portion of the whole broth. Accordingly, the antibiotic can be recovered by employing the various isolation and purification procedures utilized in the art for the recovery for such antibiotics, as described hereinafter.

The culture medium employed in producing A–10598 by cultivation of *S. hygroscopicus* can be any one of several media, since, as is evident from the above-described utilization test, the organism is capable of utilizing energy from a variety of sources. In general, it can be said that the medium should include a source or sources of assimilable carbon and nitrogen, together with the mineral salts commonly recognized as necessary or desirable in the growth of microorganisms. A source of growth factors, such as yeast or yeast extract, can be employed in the media with beneficial results. For economy of product, maximum yield of antibiotic, and ease of isolation, certain culture media containing relatively simple nutrient sources are preferred.

Satisfactory sources of carbon include arabinose, rhamnose, dextrose, fructose, raffinose, inositol, maltose, mannitol, ribose, trehalose, corn steep solids, and the like, a preferred source being Cerelose and similar products comprising principally glucose.

Satisfactory sources of nitrogen include beef extract, peptones, hydrolyzed casein, yeast, amino acid mixtures, and the like. Currently preferred sources of nitrogen are peptones and beef extracts.

Among the minerals which the medium may include are those providing calcium, magnesium, sodium, potassium, chloride, phosphate, and carbonate ions.

As is necessary for the growth and development of other microorganisms, it will be understood that essential trace elements of various kinds, some organic and some mineral, should be included in the culture medium for growing the actinomycete employed in this invention. Such trace elements are commonly supplied as impurities, incidental to the addition of the other constituents of the media.

The initial pH of the culture medium should preferably approximate neutrality. The pH of the fermenting medium tends to vary from a range of 7.0–7.2 immediately after inoculation to a range of 7.3–7.5 in 24 hours, and thereafter remains in the latter range through harvest.

Submerged aerobic fermentation conditions are the conditions of choice for the production of A–10598. For preparation of relatively small quantities of the antibiotic, shake flasks and surface culture in bottles can be employed. However, for the preparation of larger amounts of the antibiotic, submerged aerobic fermentation in sterile tanks is preferred. The fermentation medium in a sterile tank can be inoculated with a sporulated suspension of the organism. However, inasmuch as a growth lag is experienced when a sporulated suspension is employed as the inoculant, the vegetative form of the organism is preferred. By avoiding the growth lag in this manner, more efficient utilization of the fermentation equipment is realized. Accordingly, it is desirable first to produce a vegetative inoculum of the organism by inoculating a relatively small quantity of a culture medium with the spore form of the organism and incubating; and when a young, active, vegetative inoculum has been obtained, to transfer the vegetative inoculum aseptically to the larger fermentation tank. The medium in which the vegetative inoculum is produced can be either the same as, or different from, the medium utilized for the large-scale production of A–10598.

The organism which produces A–10598 grows best at a temperature of about 30° C.

As is customary in aerobic, submerged-fermentation processes, sterile air is blown through the culture medium during the fermentation. For efficient growth of the organism and consequent efficient production of the antibiotic, the volume of air employed is suitably between about 0.1 and about 1 volume of air per minute per volume of culture medium, preferably about 0.25 volume per minute per volume.

In general, maximum production of the antibiotic occurs within about 2 to 4 days after inoculation of the culture medium when the aerobic, submerged-fermentation process is employed.

Inasmuch as the antibiotic produced during the fermentation of A–10598 is located in the liquid portion of the broth, isolation techniques are designed to permit maximum recovery of the antibiotic from this source. Thus, for example, the fermentation broth as obtained may be filtered and the antibiotic recovered from the filtrate by thorough extraction with a suitable solvent such as ethyl acetate. From such an extract the crude antibiotic is obtained by evaporation of the solvent. The oily residue obtained thereby is dissolved in a hydrocarbon solvent such as benzene. The solution is filtered, concentrated, and cooled, whereupon the antibiotic principle precipitates. The precipitate is filtered off and purified by recrystallization from a suitable solvent such as benzene.

In order to illustrate more fully the operation of the invention, the example which follows is provided by way of illustration. Although the description contained herein will be made with particular reference to the newly found organism *S. hygroscopicus*, ATCC 15166, it is to be understood that production of A–10598 by the growing of other A–10598-producing strains of *S. hygroscopicus* or A–10598-producing mutants of *S. hygroscopicus*, including mutants of ATCC 15166, are within the scope of this invention. Such other strains or mutants can be produced by known procedures, such as by subjecting *S. hygroscopicus* to X-ray or ultraviolet irradiation, or to the action of chemical agents, such as, for example, the nitrogen mustards.

*Example 1*

Spores of *Streptomyces hygroscopicus*, ATCC 15166, are inoculated on a nutrient agar slant having the following composition:

| | |
|---|---|
| Starch _____ g___ | 20 |
| Asparagine _____ g___ | 1 |
| Beef extract _____ g___ | 3 |
| Agar _____ g___ | 18 |
| Soil extract _____ ml__ | 100 |
| Distilled water _____ ml__ | 900 |

The soil extract, which served to provide trace minerals necessary for the growth of the organism, was prepared by mixing soil with tap water (500 g./liter), autoclaving, filtering, and reautoclaving. The pH, which was adjusted to 7.0 before autoclaving, measured 5.5 after the autoclaving. The inoculated slants were incubated at about 30° C. for 5 to 6 days.

A medium having the following composition, expressed in grams per liter, was prepared and introduced into 500 ml. Erlenmeyer flasks, 100 ml. per flask:

| | |
|---|---|
| Cerelose _____ g__ | 15 |
| Soybean meal _____ g__ | 15 |
| Corn steep solids _____ g__ | 5 |
| Sodium chloride _____ g__ | 5 |
| Calcium carbonate _____ g__ | 2 |
| Water q.s. to make _____ l__ | 1 |

The flasks of medium were sterilized by heating for about 30 minutes at 120° C. and 15 p.s.i. steam pressure. They were then inoculated with a loop of a sporulated culture from slants prepared as described above, and were shaken and incubated on a reciprocal shaker at 30° C. for 48 hours to produce the vegetative form of the organism. Four-liter Erlenmeyer flasks containing one liter of the same medium were then inoculated with a five percent vegetable inoculum, and incubated at 30° C. on a rotary shaker for approximately twenty-four hours. The contents of the four-liter flask were used to inoculate thirty liters of a sterile production medium having the following composition:

| | |
|---|---|
| Cerelose _____ g__ | 10 |
| Molasses _____ g__ | 20 |
| Bactopeptone _____ g__ | 5 |
| Calcium carbonate _____ g__ | 2 |
| Water q.s. to make _____ l__ | 1 |

The sterile production medium was introduced into a stainless steel tank, where it was inoculated, stirred at 300 r.p.m., and aerated at 0.25 volume of air per minute per volume of culture medium at a controlled temperature of 30° C. The fermentation was allowed to proceed for 66 hours. The pH of the fermenting medium rose from about 7.0–7.2 immediately after inoculation to about 7.3–7.5 in 24 hours, and remained in the latter range through harvest.

The crude broth thus obtained was filtered using a diatomaceous earth filter aid, and the filtered broth was then extracted three times with one-third of its volume of ethyl acetate at a pH of 7.6. The ethyl acetate extract was concentrated to yield an oil, to which was added warm benzene in excess. The solids which were thereby precipitated were filtered off and discarded. The filtrate was concentrated and cooled, and the resulting precipitate was filtered off. The precipitate was dissolved in an excess of acetone. Water was added to the acetone solution to the point of cloudiness, and the cloudiness was removed by the addition of more acetone. This aqueous acetone solution was then concentrated and cooled, thereby yielding a crystalline product. The crystalline product was dissolved in chloroform. The solution was concentrated to small volume and chromatographed on an acid alumina column. The active effluent was collected and the column eluted with a 50:50 mixture of chloroform and ethyl acetate. The active effluent and this eluate were combined and concentrated to yield an oil. The oil was dissolved in acetone, and from the solution was crystallized a material identified as A–10598. The crystalline material had a melting point of about 258° C. Analysis.—Calc.: C, 61.9; H, 7.7; N, 4.5; O, 25.8. Found: C, 61.85; H, 7.28; N, 5.00; O, 24.20 (direct).

The 2,4-dinitrophenylhydrazone of A–10598 was prepared in the usual manner and was obtained as a red, crystalline solid having a melting point of about 255° C. The ethanolic solution of the derivative had a yellow color under acid conditions, a green color under neutral conditions, and a blue color under basic conditions. Analysis.—Calc.: N, 10.29.. Found: N, 10.54.

*Example 2.—Reduced A–10598*

A 500-mg. portion of A–10598 was dissolved in 100 ml. of ethyl acetate and hydrogenated for three hours at room temperature under a hydrogen pressure of 40 p.s.i., using as a catalyst 50 mg. of 5 percent palladium-on-charcoal. The colorless product had an ultraviolet absorption spectrum characterized by a shoulder at 250 m$\mu$, and a maximum at 298 m$\mu$, as well as intense end absorption, when run under neutral conditions, in ethanol. In alkaline ethanol, the maximum occured at 305 m$\mu$.

*Example 3.—Acetyl derivative of reduced A–10598*

A 100-mg. portion of reduced A–10598, prepared as described in Example 2, was dissolved in pyridine and acetylated with a large excess of acetic anhydride.

The ultraviolet absorption spectrum as determined in ethanol was characterized by intense end absorption with shoulders at 280 m$\mu$ and at 304 m$\mu$; and upon addition of potassium hydroxide, the maximum at 298 m$\mu$ which had been observed in the spectrum of the unacetylated reduced A–10598 reappeared.

We claim:
1. A method of producing antibiotic A–10598 which comprises cultivating *Streptomyces hygroscopicus* ATCC 15166 in a culture medium containing assimilable sources of carbohydrate, nitrogen, and inorganic salts under submerged aerobic conditions until a substantial amount of antibiotic A–10598 is produced by said organism in said culture medium.

2. The method of claim 1 wherein said antibiotic A–10598 is recovered from the liquid phase of the fermentation product mixture.

3. The antibiotic A–10598, said antibiotic being a yellow crystalline solid substance melting at 258° C.; which is soluble in the lower alcohols, lower alkyl esters of lower alkanoic acids, ketones, chloroform, dimethylformamide, and dimethyl sulfoxide, is slightly soluble in water, and is insoluble in benzene and petroleum ether; which has an optical rotation $[\alpha]_D^{25} = +67.6$ (0.5 w/v percent in $CHCl_3$); which has a pK'a value of 11.45 (dimethylformamide-water solution, 2:1 parts by volume); which has the approximate composition of 61.85 percent carbon, 7.28 percent hydrogen, 5.00 percent nitrogen, and 24.20 percent oxygen; which forms crystals from aqueous acetone having the following characteristics as determined from X-ray powder diffraction data:

| Interplanar spacing, d (A.) | Relative intensities $I/I_1$ |
|---|---|
| 14.0 | 1.00 |
| 10.6 | 1.00 |
| 9.36 | 0.13 |
| 7.35 | .40 |
| 6.90 | .40 |
| 6.58 | .53 |
| 5.97 | .27 |
| 5.62 | .40 |
| 5.22 | .40 |
| 5.08 | .13 |
| 4.58 | .13 |
| 4.42 | .13 |
| 3.97 | .40 |
| 3.86 | .13 |
| 3.80 | .13 |
| 3.60 | .40 | which has a molecular weight calculated from titration data of about 625; which has an empirical formula calculated from the foregoing data of $C_{32}H_{48}N_2O_{10}$; which has a first maximum in its ultraviolet absorption spectrum (determined in ethanol solution) at 257 m$\mu$, with an absorptivity value of $$E_{1cm}^{1\%} = 276$$

and a second maximum at 306 m$\mu$, with an absorptivity value of $$E_{1cm}^{1\%} = 334$$

and which as a mineral oil mull has the following distinguishable bands in its infrared absorption spectrum over the range of 2.0–15.0 microns: 2.88 (shoulder), 2.91, 3.02 (shoulder), 3.04, 3.13, 5.77, 5.87, 5.96, 6.03, 6.20, 6.27, 6.62, 6.86, 6.89 (shoulder), 7.26, 7.36, 7.56, 7.64 (shoulder), 7.99, 8.17, 8.35, 8.42 (shoulder), 8.79, 9.00, 9.08 (shoulder), 9.14 (shoulder), 9.45, 9.78, 10.13, 10.21, 10.41, 10.62 (shoulder), 10.74, 10.88 (weak), 11.00 (weak), 11.36, 11.95 (weak), 12.13 (weak), 12.46 (shoulder), 12.58, 13.10 (weak), 13.58 (weak), 14.16.

References Cited

UNITED STATES PATENTS

| 2,982,689 | 5/1961 | Donovick et al. | 167—65 |
| 3,072,531 | 1/1963 | Godtfredsen et al. | 167—65 |
| 3,097,137 | 7/1963 | Beer et al. | 167—65 |

ALBERT T. MEYERS, *Primary Examiner.*

JEROME D. GOLDBERG, *Assistant Examiner.*